US008687098B2

(12) United States Patent
Aruga et al.

(10) Patent No.: US 8,687,098 B2
(45) Date of Patent: *Apr. 1, 2014

(54) SOLID-STATE IMAGING DEVICE, CONTROL METHOD THEREFOR, AND CAMERA SYSTEM

(71) Applicant: Sony Corporation, Tokyo (JP)

(72) Inventors: Yuki Aruga, Kanagawa (JP); Hayato Wakabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,516

(22) Filed: Dec. 3, 2012

(65) Prior Publication Data
US 2013/0107082 A1    May 2, 2013

Related U.S. Application Data

(63) Continuation of application No. 12/801,709, filed on Jun. 22, 2010, now Pat. No. 8,325,255.

(30) Foreign Application Priority Data

Jul. 14, 2009   (JP) ................................. 2009-166170

(51) Int. Cl.
H04N 3/14        (2006.01)
(52) U.S. Cl.
USPC ......................................................... 348/294
(58) Field of Classification Search
USPC ......................................................... 348/294
See application file for complete search history.

(56) References Cited

U.S. PATENT DOCUMENTS

| 7,623,173 | B2 | 11/2009 | Nitta et al. |
| 7,948,533 | B2 * | 5/2011 | Koseki ........................... 348/243 |
| 8,325,255 | B2 * | 12/2012 | Aruga et al. ................... 348/294 |
| 2005/0224841 | A1 | 10/2005 | Nakamura et al. |
| 2009/0009635 | A1 | 1/2009 | Maeda et al. |
| 2009/0051801 | A1 * | 2/2009 | Mishina et al. ................ 348/311 |
| 2009/0128676 | A1 * | 5/2009 | Tanaka ........................... 348/300 |

FOREIGN PATENT DOCUMENTS

| JP | 2000-287131 | 10/2000 |
| JP | 2005-278135 | 10/2005 |
| JP | 2008-283557 | 11/2008 |
| WO | WO-03/085964 | 10/2003 |

OTHER PUBLICATIONS

W. Yang et al., "An Integrated 800×600 CMOS Imaging System," 1999 IEEE International Solid-State Circuits Conference, ISSCC Digest of Technical Papers, pp. 304-305, Feb. 1999.

* cited by examiner

*Primary Examiner* — James Hannett
(74) *Attorney, Agent, or Firm* — Rader, Fishman & Grauer PLLC

(57) ABSTRACT

A solid-state imaging device includes: a pixel section having pixels performing photoelectric conversion arranged in a matrix form; a pixel signal reading unit including an AD converting part that reads pixel signals in a unit of pixels, and compares a reference signal as a ramp waveform with the pixel signals to perform AD conversion; a clamp unit clamping the signal line with a clamp voltage such that the pixel signals are held at or greater than a set voltage; a correction bias circuit generating a clamp voltage according to a clamp voltage set value supplied and supplies the clamp voltage to the clamp unit; and a correction bias selecting unit selecting the clamp voltage set value such that the clamp voltage is generated in association with slope determining information for determining a slope of the reference signal, and supplies the clamp voltage set value to the correction bias circuit.

23 Claims, 9 Drawing Sheets

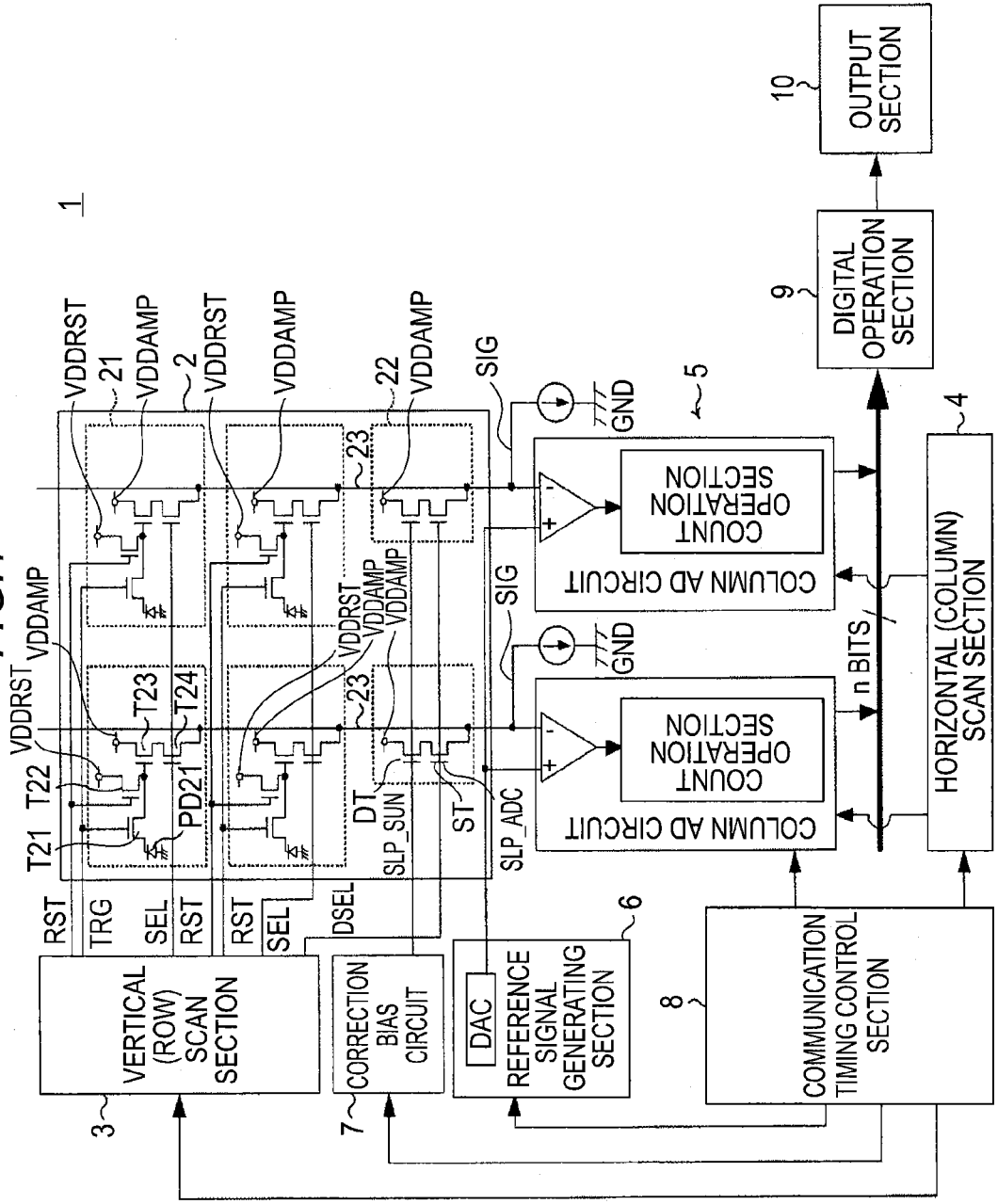

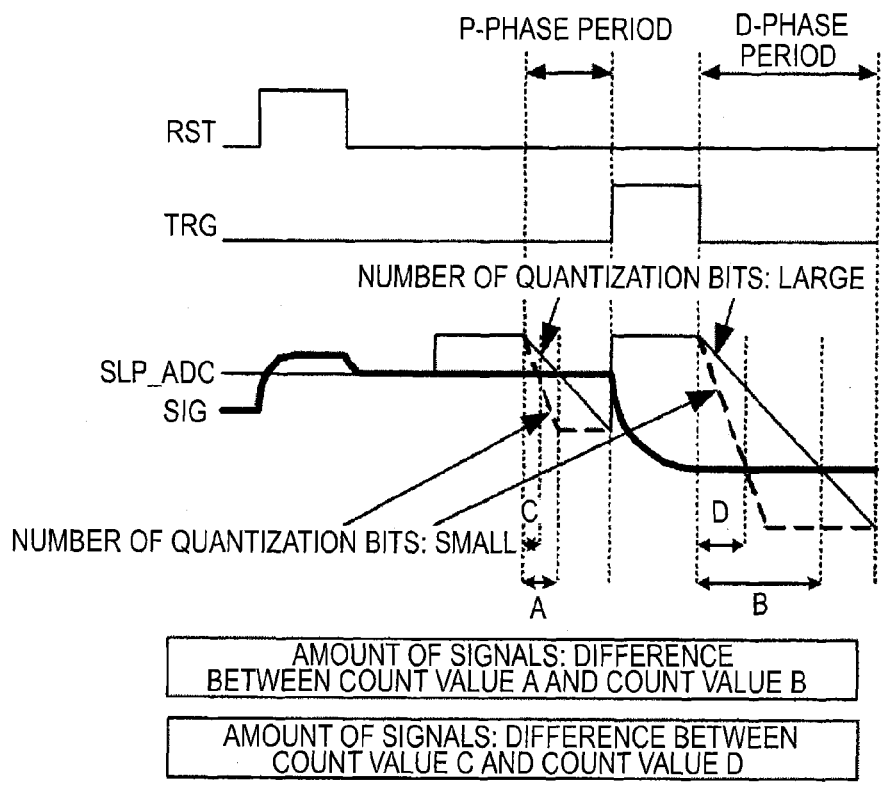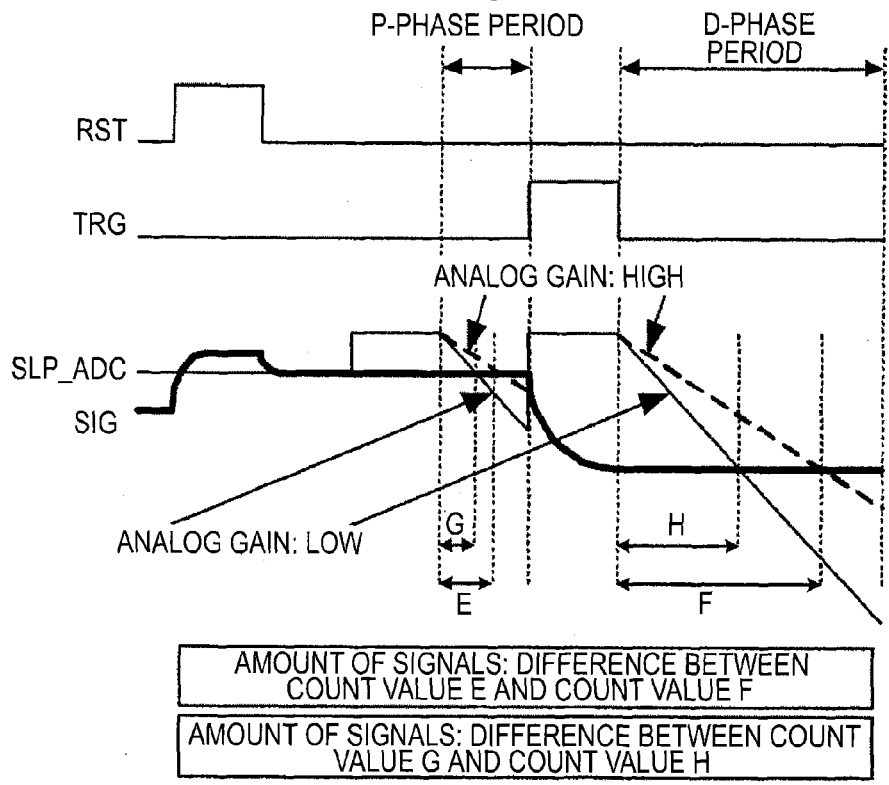

SOLID-STATE IMAGING DEVICE, CONTROL METHOD THEREFOR, AND CAMERA SYSTEM

CROSS REFERENCE TO RELATED APPLICATIONS

This is a Continuation Application of U.S. patent application Ser. No. 12/801,709, filed Jun. 22, 2010, now U.S. Pat. No. 8,325,255 issued Dec. 4, 2012, which claims priority from Japanese Application No.: 2009-166170, filed on Jul. 14, 2009, the entire contents of which are incorporated herein by reference.

BACKGROUND OF THE INVENTION

1. Field of the Invention

The present invention relates to a solid-state imaging device, typified by a CMOS image sensor, a control method therefor, and a camera system.

2. Description of the Related Art

There has been proposed a CMOS image sensor that has a pixel array section having a plurality of pixels arranged two-dimensionally, reads pixel signals, read from the individual pixels in the pixel array section, sequentially pixel column by pixel column, performs CDS (Correlated Double Sampling) or the like on each column of pixel signals to convert the pixel signals to image signals to be output.

The main stream of CMOS image sensors is of a column parallel output type which has an FD (Floating Diffusion) amplifier having an FD for each pixel, selects one row of pixels in the pixel array, and simultaneously reads pixel signals in the row in the column direction.

This is because the FD amplifiers disposed in the pixels are difficult to provide a sufficient drive performance, so that the data rate needs to be reduced, which makes the parallel processing advantageous.

Various pixel signal reading (outputting) circuits have been proposed for column parallel output type CMOS image sensors.

The most advanced type in the reading circuits has an analog-digital converter (hereinafter abbreviated as "ADC") provided for each column to acquire a pixel signal as a digital signal.

A CMOS image sensor having a column parallel ADC mounted thereon is disclosed in, for example, W. Yang et al., "An Integrated 800×600 CMOS Image System," ISSCC Digest of Technical Papers, pp. 304-305, February, 1999 (Non-patent Document 1) and JP-A-2005-278135 (Patent Document 1).

It is known that when very intense light like sunlight is input to such a CMOS image sensor, the signal level at the input portion drops, causing a blackening phenomenon in which even the light is very bright, an image appears black.

The CMOS image sensor is provided with some correction means to avoid this phenomenon (see, for example, JP-A-2008-283557 (Patent Document 2)).

As an approach to prevent a blackening phenomenon, there has been proposed a method in which an amplifier with no photodiode (hereinafter referred to as "pixel dummy amplification transistor") is provided in a pixel at the time of detecting a blackening phenomenon, and a reset voltage output from a pixel is replaced with the output voltage of the pixel dummy amplification transistor.

This method is disclosed in, for example, JP-A-2000-287131 (Patent Document 3).

Another method has also been proposed which uses a plurality of supply voltages in the pixel section according to different purposes, such as increasing the operational margin of the pixel section and complete transfer of signal charges (see, for example, WO03/085964 (Patent Document 4)).

FIG. 1 is a circuit diagram showing the general configuration of a solid-state imaging device (CMOS image sensor) to which the proposed techniques are adapted.

A solid-state imaging device 1 includes a pixel section 2, a vertical scan section 3, a horizontal scan section 4, and a column processing circuit group 5 having ADCs as shown in FIG. 1.

The solid-state imaging device 1 further includes a digital-analog converter (hereinafter abbreviated as "DAC") 6, a correction bias circuit 7, a communication timing control section 8, a digital operation section 9, and an output section 10.

The valid pixel region of the pixel section 2 has a two-dimensional array of unit pixels 21, each column having a pixel dummy section 22 including a pixel dummy amplification transistor.

The unit pixel 21 has a photodiode PD21 which is a photoelectric converting element. The unit pixel 21 further includes a total of four transistors, namely, a transfer transistor T21, a reset transistor T22, an amplification transistor T23, and a selection transistor T24.

A transfer pulse TRG, a reset pulse RST, a selection pulse SEL, etc. are supplied to the respective pixel transistors from the vertical scan section 3 to convert signal charges, obtained by the photodiode PD21, to a pixel signal SIG, which is in turn output to a vertical signal line 23.

The pixel dummy section 22 includes a pixel dummy amplification transistor DT and a pixel dummy selection transistor ST. The pixel dummy section 22 is controlled by a selection pulse DSEL from the vertical scan section 3, and a clamp voltage SLP_SUN from a blackening correction bias circuit.

Although the unit pixel part is configured to include four transistors in the above description, it may have another configuration having, for example, three transistors excluding the selection transistor. It is desirable that the pixel dummy section 22 has the same configuration as that of the unit pixel part.

FIGS. 2A and 2B are diagrams for explaining an operation and AD conversion for a row of pixels to be read when the amount of light is normal and when the light is very intense to cause a blackening phenomenon.

An output at the time of the normal amount of light shown in FIG. 2A is given by the difference between a count value in a period A where a pixel signal SIG becomes identical to a reference signal SLP_ADC for AD conversion in a P-phase period and a count value in a period B where a pixel signal SIG becomes identical to the reference signal SLP_ADC for AD conversion in a D-phase period.

On the other hand, an output at the time of the very intense amount of light which causes a blackening phenomenon shown in FIG. 2B is clamped so that the pixel signal SIG is not made equal to or lower than a set voltage by a clamp voltage SLP_SUN from blackening correction bias circuit.

Accordingly, the pixel signal SIG does not become identical to the reference signal SLP_ADC for AD conversion in the P-phase period as seen in a period C.

When the pixel signal SIG does not become identical to the reference signal SLP_ADC for AD conversion in the P-phase period, it is determined that a blackening phenomenon has occurred, and the count value is counted fully, or the blackening phenomenon is corrected by performing an operation such as replacing the count value with a fixed count value that is equal to or greater than a saturation signal. It is to be noted however that the clamp voltage SLP_SUN from the blackening correction bias circuit needs to be set properly. When the set value is improper, the blackening phenomenon cannot be corrected, or the correction may be executed improperly to degrade the output characteristic at the normal time.

SUMMARY OF THE INVENTION

With such a circuit configuration, however, the slope of the reference signal SLP_ADC for AD conversion changes according to the number of quantization bits, the analog gain, the drive frequency of the counter part, etc.

This narrows the range where the blackening phenomenon can be corrected with the set value for the clamp voltage SLP_SUN.

When a plurality of supply voltages for the pixel section are used as described in Patent Document 4, the reference voltage for the blackening correction bias circuit may differ from a pixel-section reset voltage, and independent variations in the reference voltage and the reset voltage narrow the blackening-correctable range.

In consideration of those conditions, process variations of transistors and the like, when the set value for the clamp voltage SLP_SUN from the blackening correction bias circuit is used as fixed, the improper clamp voltage may raise a problem under some conditions.

As apparent from the above, the techniques according to the related arts have the problem that the blackening-correctable range is limited by some conditions.

Thus, it is desirable to provide a solid-state imaging device, a control method therefor, and a camera system, which can widen the blackening-correctable range.

A solid-state imaging device according to an embodiment of the invention includes a pixel section having a plurality of pixels performing photoelectric conversion arranged in a matrix form, a pixel signal reading section including an analog-digital (AD) converting part that reads pixel signals from the pixel section to a signal line in a section of a plurality of pixels, and compares a reference signal as a ramp waveform with the pixel signals to perform AD conversion, a clamp section that clamps the signal line with a clamp voltage in such a way that the pixel signals are held at or greater than a set voltage, a correction bias circuit that generates a clamp voltage according to a clamp voltage set value supplied and supplies the clamp voltage to the clamp section, and a correction bias selecting section that selects the clamp voltage set value in such a way that the clamp voltage is generated in association with slope determining information for determining a slope of the reference signal, and supplies the clamp voltage set value to the correction bias circuit.

A control method for a solid-state imaging device according to another embodiment of the invention includes a readout step of reading pixel signals from a pixel section having a plurality of pixels performing photoelectric conversion arranged in a matrix form to a signal line in a section of a plurality of pixels, a clamp step of clamping the signal line with a clamp voltage in such a way that the pixel signals are held at or greater than a set voltage, and a pixel signal reading step of allowing an analog-digital (AD) converting part to compare a reference signal as a ramp waveform with the pixel signals to perform AD conversion, wherein in the clamp step, a clamp voltage set value is selected in such a way that the clamp voltage is generated in association with slope determining information for determining a slope of the reference signal, and a clamp voltage according to the selected clamp voltage set value is generated to clamp the signal line with the clamp voltage.

A camera system according to still another embodiment includes a solid-state imaging device, and an optical system that forms an image of a subject on the solid-state imaging device, the solid-state imaging device including a pixel section having a plurality of pixels performing photoelectric conversion arranged in a matrix form, a pixel signal reading section including an analog-digital (AD) converting part that reads pixel signals from the pixel section to a signal line in a section of a plurality of pixels, and compares a reference signal as a ramp waveform with the pixel signals to perform AD conversion, a clamp section that clamps the signal line with a clamp voltage in such a way that the pixel signals are held at or greater than a set voltage, a correction bias circuit that generates a clamp voltage according to a clamp voltage set value supplied and supplies the clamp voltage to the clamp section, and a correction bias selecting section that selects the clamp voltage set value in such a way that the clamp voltage is generated in association with slope determining information for determining a slope of the reference signal, and supplies the clamp voltage set value to the correction bias circuit.

The embodiments of the invention can widen the blackening-correctable range.

BRIEF DESCRIPTION OF THE DRAWINGS

FIG. 1 is a circuit diagram showing the general configuration of a solid-state imaging device (CMOS image sensor) to which the proposed techniques are adapted;

FIG. 5 is a diagram showing that the slope of a reference signal for AD conversion is changed by the number of the quantization bits;

FIG. 6 is a diagram showing that the slope of a reference signal for AD conversion is changed by a set value for an analog gain;

DESCRIPTION OF THE PREFERRED EMBODIMENT

A preferred embodiment of the present invention will be described below with reference to the accompanying drawings. The description will be given in the following order.
1. Example of General Configuration of Solid-state Imaging Device
2. Example of Configuration of Column ADC
3. Example of Control on Correction Bias Selection
4. Example of Configuration of Camera System FIG. 3 is a block diagram showing an example of the configuration of a column parallel ADC mounted solid-state imaging device (CMOS image sensor) 100 according to an embodiment of the invention.

<1. Example of General Configuration of Solid-state Imaging Device>

Figure 2A:
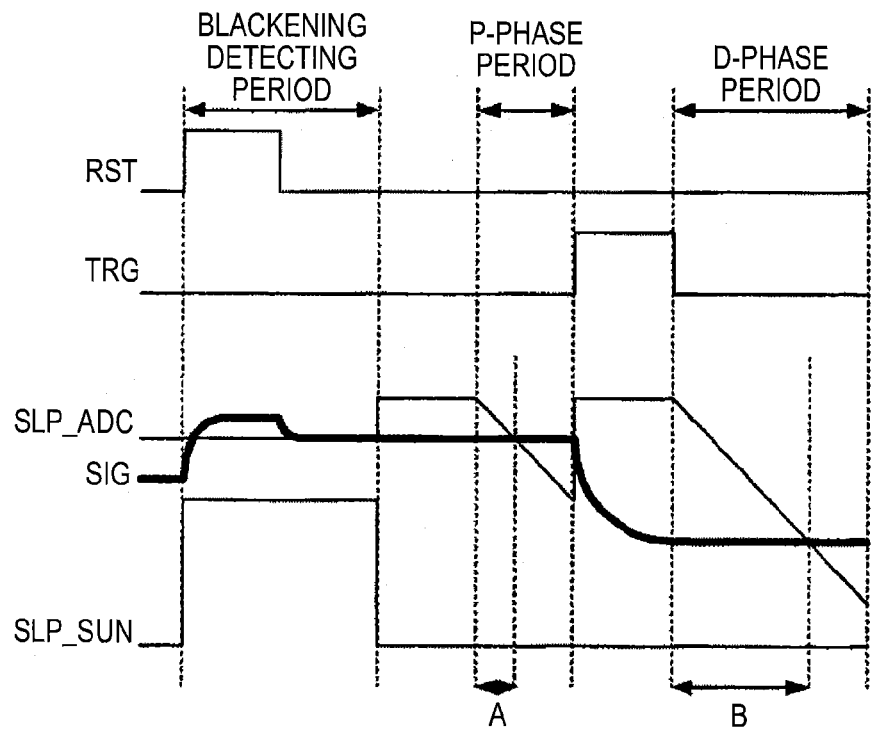
FIGS. 2A and 2B are diagrams for explaining an operation and AD conversion for a row of pixels to be read when the amount of light is normal and when the light is very intense to cause a blackening phenomenon.
Figure 2B:
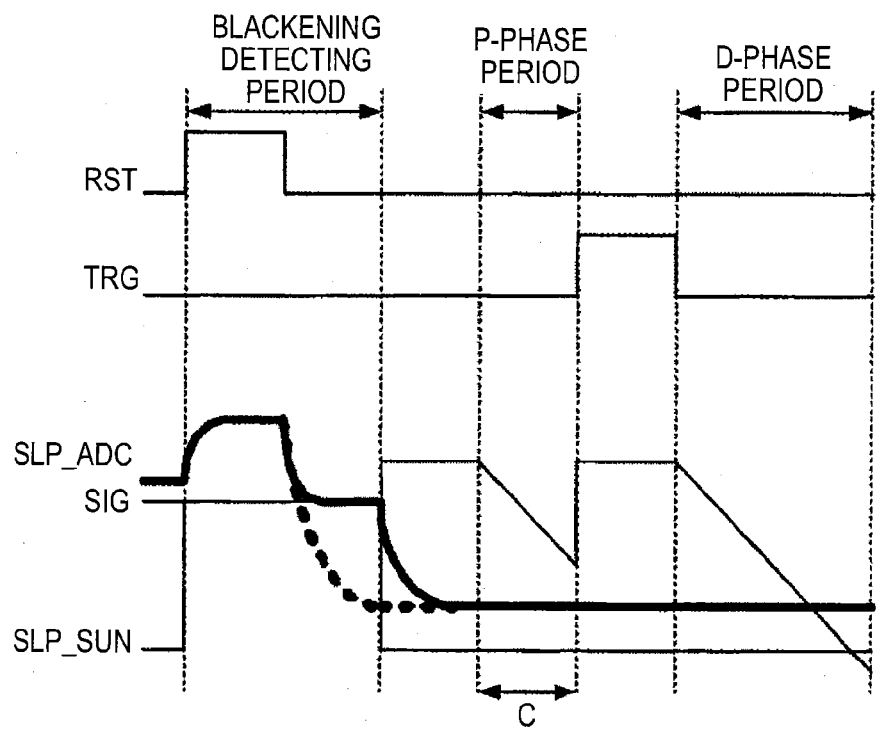
Figure 3:
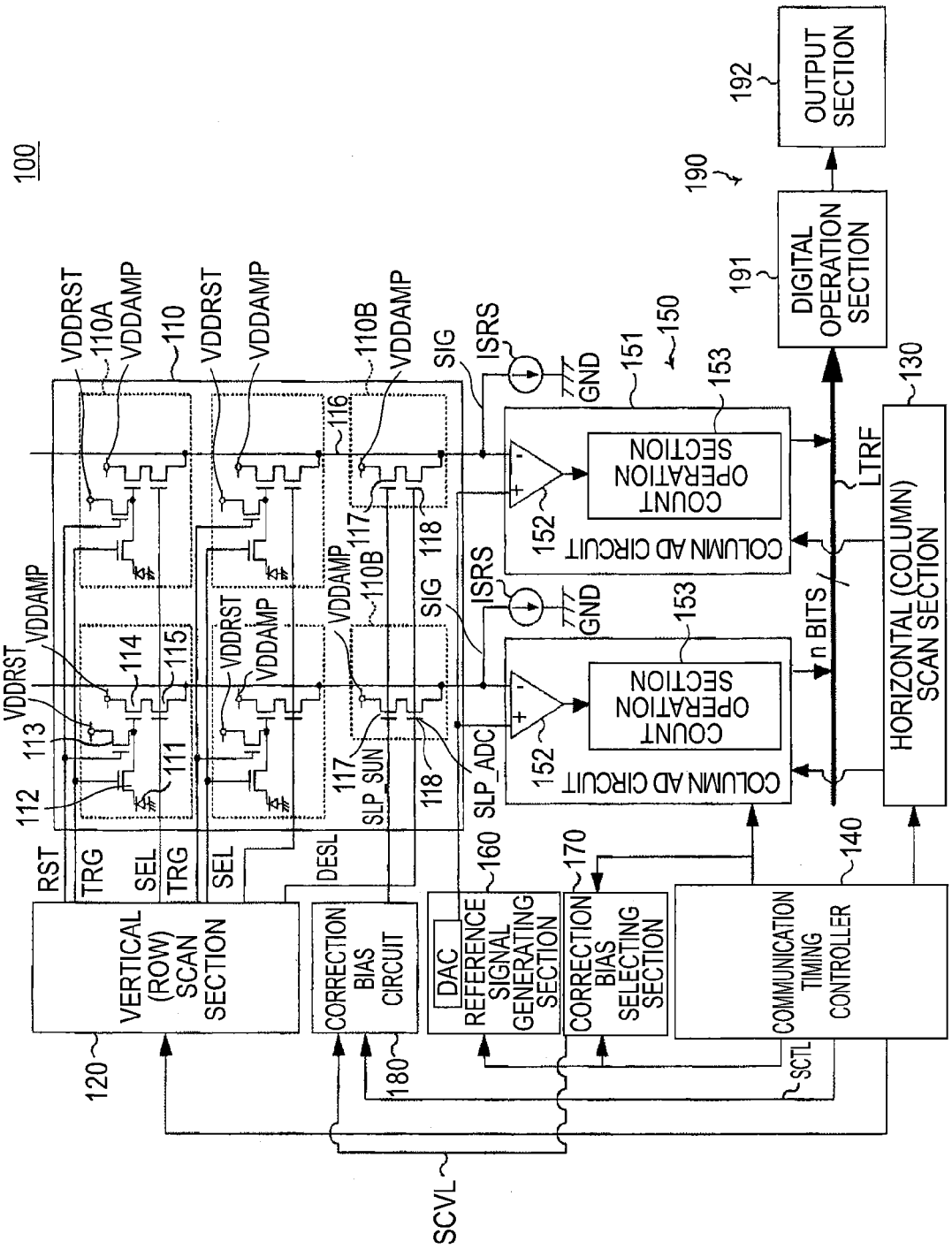
FIG. 3 is a block diagram showing an example of the configuration of a column parallel ADC mounted solid-state imaging device (CMOS image sensor) according to an embodiment of the invention.

As shown in FIG. 3, the solid-state imaging device 100 has a pixel section 110 as an imaging section, a vertical (row) scan section 120, a horizontal (column) scan section 130, and a communication timing controller 140.

The solid-state imaging device 100 further has an column processing circuit group 150 as a group of ADCs, a DAC 160 as a reference signal generating section, a correction bias selecting section 170, a correction bias circuit 180, and a signal processing section 190.

The signal processing section 190 has a digital operation section 191 and an output section 192.

The solid-state imaging device 100 according to the embodiment generates a clamp voltage for detecting blackening based on a supply voltage equal to the reset voltage for the pixel section to suppress a variation in supply voltage and widen the blackening-correctable range.

The solid-state imaging device 100 according to the embodiment changes the blackening detecting clamp voltage in association with the number of the quantization bits which determines the slope of a reference signal for AD conversion, an analog gain, the frequency of the counter part in a column AD circuit, etc.

Accordingly, the solid-state imaging device 100 has a capability of setting the optimal clamp voltage under each condition to widen the blackening-correctable range.

The pixel section 110 has a two-dimensional array (matrix) of unit pixels 110A in m rows and n columns, each unit pixel 110A including a photodiode (photoelectric converting element) and an intrapixel amplifier.

The pixel section 110 also has pixel dummy sections 110B as clamp sections in association with the individual columns of the pixel array.

The pixel dummy section 110B as the clamp section clamps a vertical signal line 116 in such a way that a pixel signal SIG is held equal to or higher than a set voltage by the clamp voltage, i.e., the pixel signal SIG does not become equal to or lower than the set voltage.

[Example of Configuration of Unit Pixel]

Figure 4:
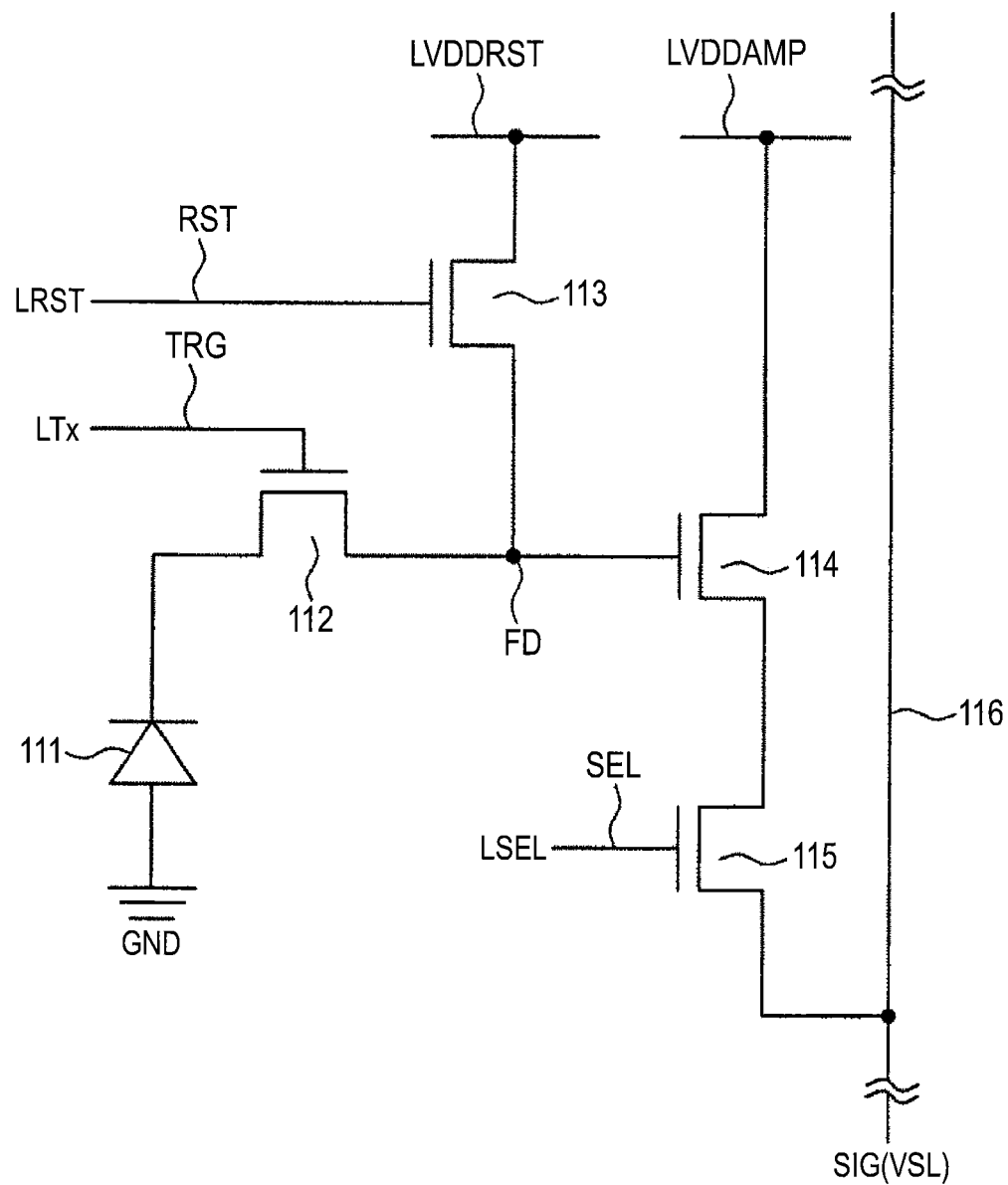
FIG. 4 is a diagram showing in enlargement an example of a pixel in the CMOS image sensor having four transistors according to the embodiment.

FIG. 4 is a diagram showing in enlargement an example of a pixel in the CMOS image sensor having four transistors according to the embodiment.

The unit pixel 110A has a photodiode 111 as a photoelectric converting element.

The unit pixel 110A has four transistors as active elements for a single photodiode 111, namely, a transfer transistor 112 as a transfer element, a reset transistor 113 as a reset element, an amplification transistor 114 and a selection transistor 115.

The photodiode 111 photoelectrically converts input light to charges (electrons in this example) whose quantity corresponds to the amount of the input light.

The transfer transistor 112 is connected between the photodiode 111 and a floating diffusion FD as an output node.

When a transfer signal TRG is supplied to the gate (transfer gate) of the transfer transistor 112 via a transfer control line LTx, the transfer transistor 112 transfers the electrons photoelectrically converted by the photodiode 111 to the floating diffusion FD.

The reset transistor 113 is connected between a power line LVDDRST and the floating diffusion FD.

When a reset signal RST is supplied to the gate of the reset transistor 113 via a reset control line LRST, the reset transistor 113 resets the potential of the floating diffusion FD to the potential of the power line LVDDRST.

A voltage VDDRST which is supplied to the power line LVDDRST connected with the drain of the reset transistor 113 is generated based on the supply voltage equal to the blackening detecting clamp voltage.

The floating diffusion FD is connected with the gate of the amplification transistor 114.

The amplification transistor 114 has a source connected to the vertical signal line 116 via the selection transistor 115, and forms a source follower together with a constant current source ISRS located outside the pixel section. The drain of the amplification transistor 114 is connected to a power line LVDDAMP.

Then, a control signal (address signal or selection signal) SEL is supplied to the gate of the selection transistor 115 via a selection control line LSEL to turn on the selection transistor 115.

When the selection transistor 115 is turned on, the amplification transistor 114 amplifies the potential of the floating diffusion FD, and outputs a voltage (pixel signal SIG) corresponding to the potential to the vertical signal line 116.

The pixel signals SIG equivalent to voltages output from the individual pixels are output to the column processing circuit group 150 as a pixel-signal reading circuit via the vertical signal line 116.

Because the gates of the transfer transistor 112, the reset transistor 113 and the selection transistor 115, for example, are connected row by row, those operations are executed in parallel at the same time for one row of pixels.

A set of the reset control line LRST, the transfer control line LTx and the selection control line LSEL provided in the pixel section 110 is laid out for each row of pixels.

Those reset control line LRST, transfer control line LTx and selection control line LSEL are driven by the vertical scan section 120 as a pixel driving section.

[Example of Configuration of Pixel Dummy Section]

The pixel dummy section 110B is configured to include a pixel dummy amplification transistor 117, and a pixel dummy selection transistor 118.

The pixel dummy amplification transistor 117 has a drain connected to the power line LVDDAMP, and a source connected to the drain of the pixel dummy selection transistor 118.

The source of the pixel dummy selection transistor 118 is connected to the vertical signal line 116.

The gate of the pixel dummy amplification transistor 117 is connected to a supply line for a clamp voltage SLP SUN to be supplied by the correction bias circuit 180.

The gate of the pixel dummy selection transistor 118 is connected to a supply line for a selection pulse DSEL to be supplied by the vertical scan section 120.

As apparent from the above, the pixel dummy section 110B is controlled by the selection pulse DSEL from the vertical scan section 120 and the clamp voltage SLP_SUN from the correction bias circuit 180.

Although a unit pixel part is configured to have four transistors in the foregoing description, it may have another configuration having, for example, three transistors excluding the selection transistor.

It is desirable that the pixel dummy section 110B has the same configuration as that of the unit pixel part.

The solid-state imaging device 100 is provided therein with the communication timing controller 140 which generates internal clocks as a control circuit for sequentially reading signals from the pixel section 110, the vertical scan section 120 which controls row addresses and row scanning, and the horizontal scan section 130 which controls column addresses and column scanning.

The communication timing controller 140 generates timing signals needed in signal processings of the pixel section 110, the vertical scan section 120, the horizontal scan section 130, the column processing circuit group 150, the DAC 160, the correction bias selecting section 170, the correction bias circuit 180, and so forth.

The communication timing controller 140 includes a DAC control section which controls generation of a reference signal SLP_ADC (RAMP) in the DAC 160.

The DAC control section performs control in such a way as to adjust the slope of the reference signal SLP_ADC for each row to be subjected to AD conversion by each column processing circuit (ADC) 151 in the column processing circuit group 150.

The DAC control section can perform control in such a way as to adjust the slope of the reference signal SLP_ADC for each of the first sampling and the second sampling according to the difference in the number of the quantization bits at the time of performing CDS (Correlated Double Sampling) in the column processing circuit group 150.

The pixel section 110 photoelectrically converts a video image or screen image to an analog pixel signal SIG for each row of pixels by storing and discharging photons using a line shutter, and outputs the analog pixel signal SIG to each column processing circuit 151 in the column processing circuit group 150.

In the column processing circuit group 150, each ADC block (each column part) performs APGA-compatible integrated ADC and digital CDS on the anlog output from the pixel section 110 using the reference signal SLP_ADC from the DAC 160 to output a digital signal of several bits.

<2. Example of Configuration of Column ADC>

The column processing circuit group 150 according to the embodiment has plural columns of column processing circuits (ADCs) 151 as ADC blocks.

That is, the column processing circuit group 150 has k bit digital signal converting function, and has individual ADCs 151 disposed for vertical signal lines (column lines) 116-1 to 116-n respectively, thereby forming a column parallel ADC blocks.

Each ADC 151 has a comparator 152 to compare the reference signal SLP_ADC having a ramp waveform, which is obtained by changing the reference signal generated by the DAC 160 stepwise, with the analog pixel signals SIG obtained via the vertical signal line 116 from each row of pixels.

Further, each ADC 151 has a counter latch 153 which counts the comparison time and holds the counting result.

The output of each counter latch 153 is connected to a horizontal transfer line LTRF having a width of, for example, k bits.

In the column processing circuit group 150, the analog pixel signals SIG read onto the vertical signal line 116 are compared with the reference signal SLP_ADC (ramp signal RAMP as a slope waveform which linearly changes at a given inclination) by the comparator 152 disposed for each column.

At this time, the counter latch 153, disposed for each column like the comparator 152, is operating.

Each ADC 151 converts the potential (analog signal), Vs1, of the vertical signal line 116 to a digital signal as the reference signal SLP_ADC with a ramp waveform and the count value change in one-to-one correspondence.

The ADC 151 converts a change in the voltage of the reference signal SLP_ADC to a change in time, and counts the time in a given cycle (clock) to convert the time to a digital value.

When the analog pixel signal SIG crosses the reference signal SLP_ADC, the output of the comparator 152 is inverted to stop the input clock to the counter latch 153 or input the clock whose input has been stopped to the counter latch 153, thereby completing AD conversion.

After the AD conversion period ends, the horizontal scan section 130 transfers data held in the counter latch 153 to the horizontal transfer line LTRF. The data is input via an amplifier to the signal processing section 190 to be subjected to predetermined signal processing to generate a two-dimensional image.

The horizontal scan section 130 performs parallel transfer for several channels at the same time to secure the transfer rate.

The communication timing controller 140 generates timings needed in the signal processes in the individual blocks, such as the pixel section 110 and the column processing circuit group 150.

The signal processing section 190 at the subsequent stage performs digital signal processes, such as correction of vertical line defect or point defect on signals stored in a line memory, signal clamping, parallel-serial conversion, compression, encoding, addition, averaging and intermittent operation.

Digital signals sent for each row of pixels are stored in the line memory.

In the solid-state imaging device 100 according to the embodiment, the digital output of the signal processing section 190 is sent as an input to an ISP or a baseband LSI.

The DAC 160 generates the reference signal (ramp signal) with a slope waveform which linearly changes at a given inclination) under control of the DAC control section, and supplies the reference signal SLP_ADC to the column processing circuit group 150.

The slope of the reference signal SLP_ADC for AD conversion changes according to slope determining information.

This slope determining information includes the number of quantization bits, a set value for the analog gain, and the frequency of the counter part in the column AD circuit.

Therefore, the slope of the reference signal SLP_ADC for AD conversion is changed by, for example, the number of quantization bits, a set value for the analog gain, or the frequency of the counter part in the column AD circuit.

FIG. 5 is a diagram showing that the slope of the reference signal SLP_ADC for AD conversion is changed by the number of the quantization bits.

FIG. 6 is a diagram showing that the slope of the reference signal SLP_ADC for AD conversion is changed by a set value for the analog gain.

As shown in FIG. 5, the slope of the reference signal SLP_ADC for AD conversion becomes gentler as the number of the quantization bits becomes larger, and becomes sharper as the number of the quantization bits becomes smaller.

Therefore, the time (count value) needed for the reference signal SLP_ADC for AD conversion to coincide with the pixel signal SIG differs between a P-phase period and a D-phase period.

When the number of the quantization bits is large, for example, the amount of signals becomes the difference between a count value A in the P-phase period and a count value B in the D-phase period.

When the number of the quantization bits is small, the amount of signals becomes the difference between a count value C in the P-phase period and a count value D in the D-phase period.

As shown in FIG. 6, the slope of the reference signal SLP_ADC for AD conversion becomes gentler as the set value for the analog gain becomes higher, and becomes sharper as the set value for the analog gain becomes lower.

Therefore, the time (count value) needed for the reference signal SLP_ADC for AD conversion to coincide with the pixel signal SIG differs between the P-phase period and the D-phase period.

When the set value for the analog gain is high, for example, the amount of signals becomes the difference between a count value E in the P-phase period and a count value F in the D-phase period.

When the set value for the analog gain is low, the amount of signals becomes the difference between a count value G in the P-phase period and a count value H in the D-phase period.

<3. Example of Control on Correction Bias Selection>

The correction bias selecting section 170 receives data which determines a factor for determining the slope of the reference signal SLP_ADC for AD conversion from the communication timing controller 140, and sends an optimal blackening-detecting-clamp-voltage setting value SCVL to the correction bias circuit 180.

The correction bias circuit 180 generates a blackening detecting clamp voltage SLP_SUN according to the blackening-detecting-clamp-voltage setting value SCVL set by the correction bias selecting section 170, and supplies this blackening detecting clamp voltage SLP_SUN to the gate of the pixel dummy amplification transistor 117 of the pixel dummy section 110B.

Figure 7:
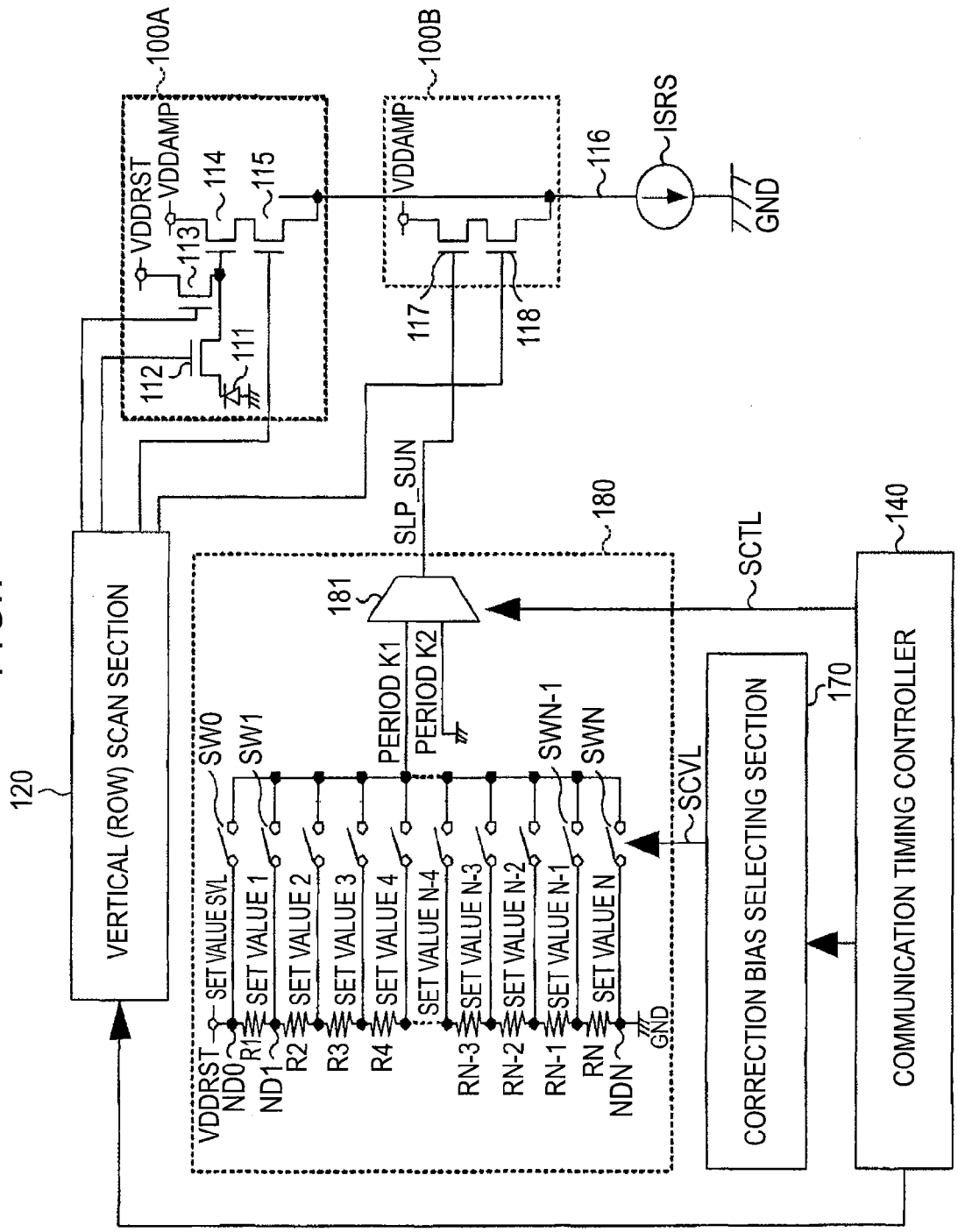
FIG. 7 is a diagram showing an example of a circuit including a correction bias circuit according to the embodiment.

FIG. 7 is a diagram showing an example of a circuit including the correction bias circuit according to the embodiment.

Figures 8, 9:
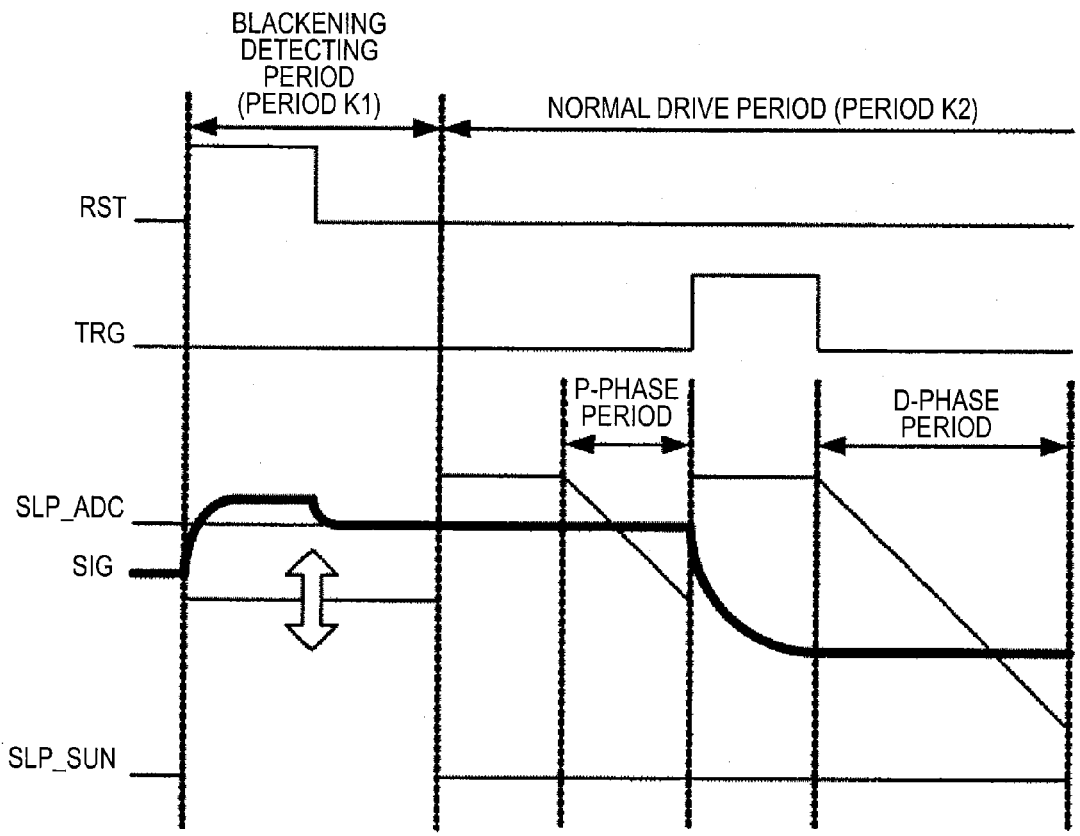
FIG. 8 is a diagram illustrating operational timings of the solid-state imaging device according to the embodiment in a blackening detecting period and a normal drive period.
FIG. 9 is a diagram showing an example of a clamp voltage table for the slope of the reference signal for AD conversion, which is formed in a correction bias selecting section according to the embodiment.

FIG. 8 is a diagram illustrating operational timings of the solid-state imaging device according to the embodiment in a blackening detecting period and a normal drive period.

The correction bias circuit 180 has N resistors R1 to RN connected in series between the power line LVDDRST and a ground GND as a reference potential, and nodes ND0 to NDN with set voltage values at which N+1 blackening detecting clamp voltages are generated by resistor-based voltage division.

The correction bias circuit 180 has a selector 181 and switches SW0 to SWN which selectively supply set voltage values SVL0 to SVLN at the nodes ND0 to NDN to the first input of the selector 181.

The ON/OFF actions of the switches SW0 to SWN are controlled according to the blackening-detecting-clamp-voltage setting value SCVL set by the correction bias selecting section 170.

The selector 181 has the first input connected to the output terminals of the switches SW0 to SWN, and the second input connected to the reference potential, e.g., ground GND.

The selector 181 selects the first input or the second input according to a selection control signal SCTL from the communication timing controller 140, and outputs the blackening detecting clamp voltage SLP_SUN with a level corresponding to the selected input.

Here, the reset voltage VDDRST for the pixel section 110 is set identical to the voltage to be the reference for resistor-based voltage division.

Accordingly, when the reset voltage VDDRST for the pixel section 110 changes, the blackening detecting clamp voltage SLP_SUN changes in association therewith, thus suppressing a variation in supply voltage.

This widens the blackening-correctable range at the fixed blackening-detecting-clamp-voltage setting value.

The communication timing controller 140 changes over the blackening detecting clamp voltage SLP_SUN between the blackening detecting period and the other period.

In FIG. 7, a period K1 indicates the blackening detecting period, and a period K2 indicates the normal drive period.

As described above, the correction bias selecting section 170 sets an optimal clamp voltage for the slope of the reference signal SLP_ADC for AD conversion with respect to correction bias circuit 180.

Therefore, the blackening detecting clamp voltage SLP_SUN varies according to the slope of the reference signal SLP_ADC for AD conversion, as shown in FIG. 8.

This widens the blackening-correctable range.

According to the embodiment, the clamp set value for the correction bias circuit 180 is N+1, which can be changed according to a change in resistance.

Although the set voltage in the normal drive period (period K2) is the ground potential in the example in FIG. 7, it can be any voltage which does not affect the normal drive period.

As described above, the embodiment of the invention can widen the blackening-correctable range which is limited by some conditions according to the related art.

As modification of the invention, the blackening-correctable range can be widened under external control instead of mounting the correction bias selecting section inside the solid-state imaging device (CMOS image sensor).

In general, the slope of the reference signal SLP_ADC for AD conversion is determined by the contents of communication from outside the solid-state imaging device (CMOS image sensor).

This can allow the solid-state imaging device (CMOS image sensor) to operate in association with the slope of the reference signal SLP_ADC for AD conversion by performing communication-based control on the clamp voltage set by the correction bias circuit according to the contents of the slope of the reference signal SLP_ADC for AD conversion.

This can make the blackening-correctable range wider than that permitted by the related art.

FIG. 9 is a diagram showing an example of a clamp voltage table for the slope of the reference signal for AD conversion, which is formed in the correction bias selecting section according to the embodiment.

The correction bias selecting section 170 holds a table TBL170 for set voltages corresponding to conditions for determining the slope of the reference signal for AD conversion as shown in, for example, FIG. 9.

The correction bias selecting section 170 extracts a set value corresponding to the condition for the blackening detecting period (period K1) shown in FIG. 8 from the table TBL170, and outputs the set value to the correction bias circuit 180.

The set voltage table TBL170 shows analog gains Gain and the number of the quantization bits, QBN, in association with each other.

When the analog gain lies in a range of 0 dB≤Gain<3 dB, and the quantization bit number QBN is 9 bits, the set value SVL is set to "2".

When the analog gain lies in a range of 0 dB≤Gain<3 dB, and the quantization bit number QBN is 12 bits, the set value SVL is set to "4".

When the analog gain lies in a range of 3 dB≤Gain<6 dB, and the quantization bit number QBN is 9 bits, the set value SVL is set to "3".

When the analog gain lies in a range of 3 dB≤Gain<6 dB, and the quantization bit number QBN is 12 bits, the set value SVL is set to "5".

When the analog gain lies in a range of 12 dB≤Gain<15 dB, and the quantization bit number QBN is 9 bits, the set value SVL is set to "6".

When the analog gain lies in a range of 12 dB≤Gain<15 dB, and the quantization bit number QBN is 12 bits, the set value SVL is set to "8".

When the analog gain lies in a range of 15 dB≤Gain<18 dB, and the quantization bit number QBN is 9 bits, the set value SVL is set to "7".

When the analog gain lies in a range of 15 dB≤Gain<18 dB, and the quantization bit number QBN is 12 bits, the set value SVL is set to "9".

Next, an example of the configuration of the correction bias selecting section 170 will be described.

Figure 10:
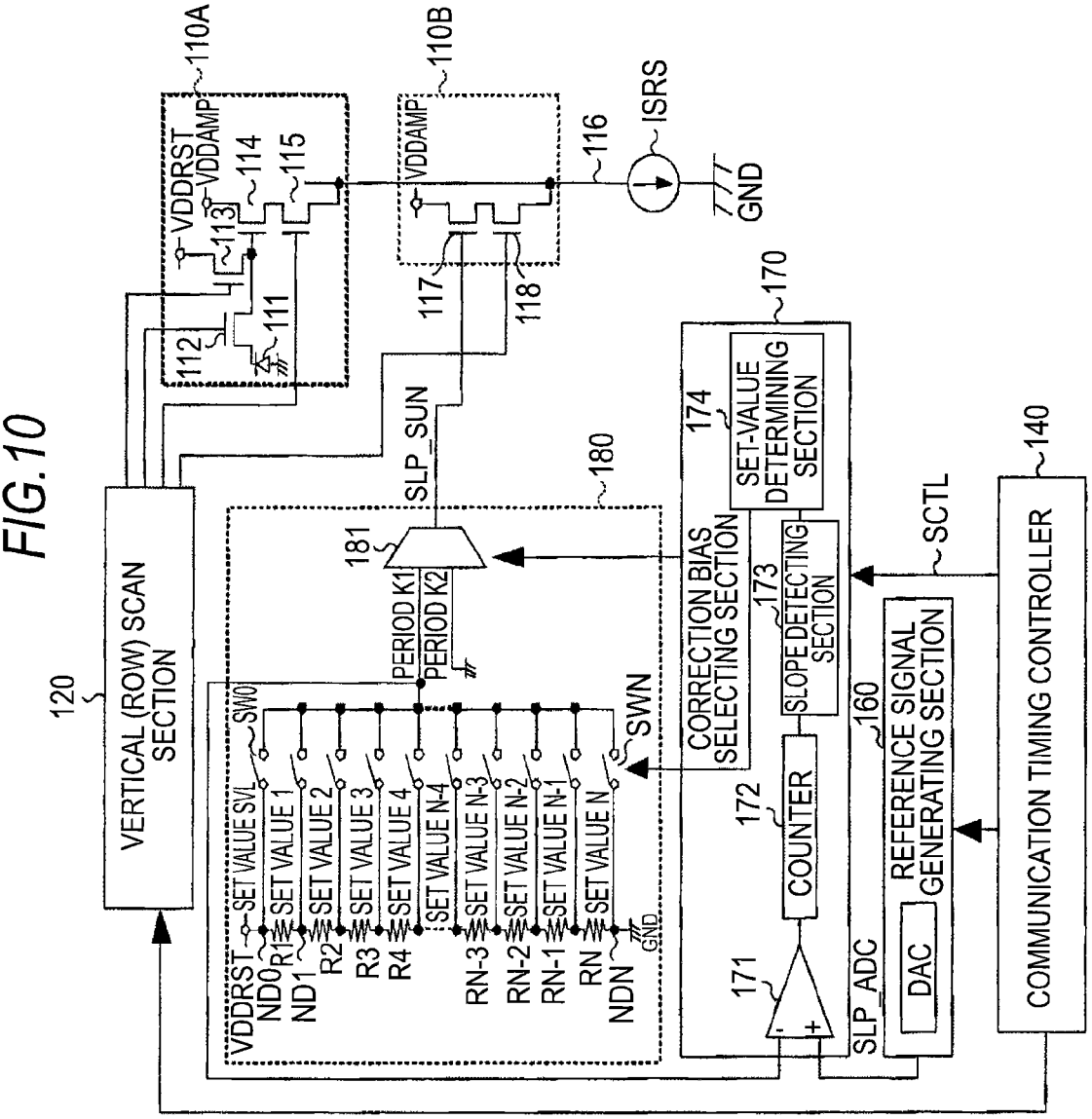
FIG. 10 is a diagram showing an example of the configuration of the correction bias selecting section according to the embodiment.

FIG. 10 is a diagram showing an example of the configuration of the correction bias selecting section according to the embodiment.

Figure 11:
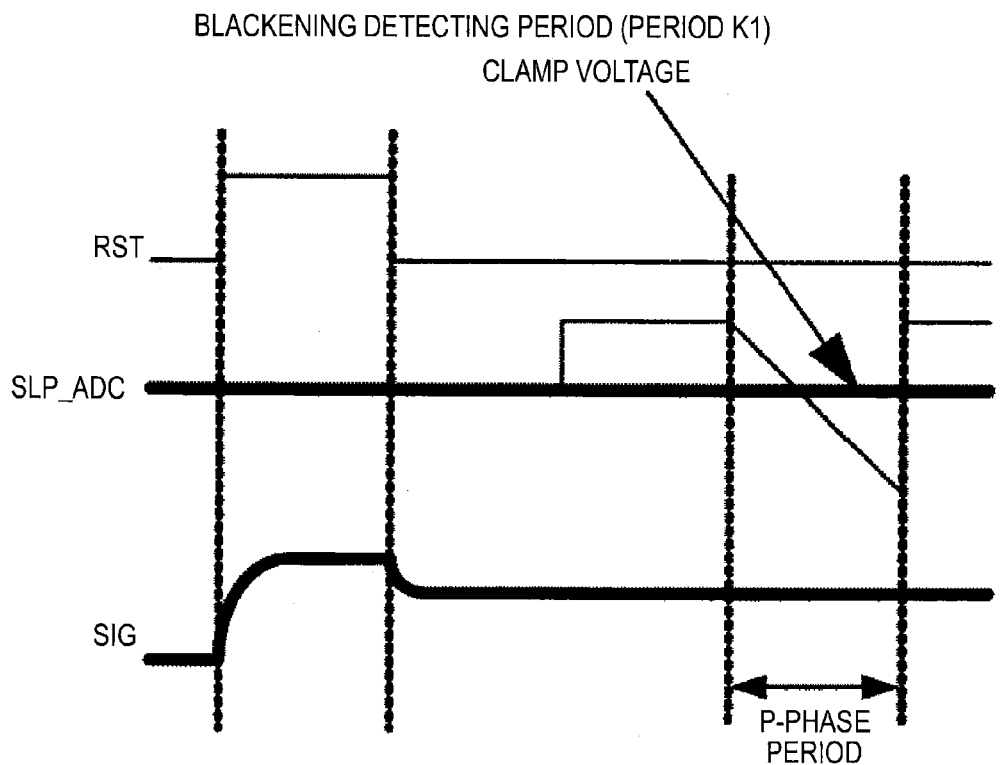
FIG. 11 is a diagram illustrating a timing chart for explaining the operation of the correction bias selecting section in FIG. 10 in the blackening detecting period.

FIG. 11 is a diagram illustrating a timing chart for explaining the operation of the correction bias selecting section in FIG. 10 in the blackening detecting period.

The correction bias selecting section 170 in FIG. 10 has a comparator 171, a counter 172, a slope detecting section 173, and a set-value determining section 174.

As shown in FIG. 10, the comparator 171 in the correction bias selecting section 170 compares the reference signal SLP_ADC for AD conversion with the clamp voltage for the blackening detecting period K1 to detect the slope of the reference signal SLP_ADC for AD conversion.

When the detected slope is out of the allowance range, the set value for the clamp voltage is controlled to be changed to lie within the allowance range.

In the correction bias selecting section 170, the reference signal (SLP_ADC) for AD conversion is compared with the clamp voltage for the blackening detecting period K1, not the pixel signal (SIG).

The reference signal SLP_ADC for AD conversion starts inclining from a voltage having a certain offset voltage with respect to the clamp voltage. Therefore, the slope of the present reference signal (SLP_ADC) for AD conversion is acquired from the count value counted by the counter 172 until the offset voltage crosses the clamp voltage.

The initial value for the clamp voltage is a set value set previously by the solid-state imaging device (CMOS image sensor) or a set value determined through the initial communication.

The set-value determining section 174 determines whether the slope lies within the allowance range. When the slope lies off the allowance range, the set-value determining section 174 changes the present set value.

An optimal clamp voltage can be set for the reference signal SLP_ADC for AD conversion by repeating this process.

As the circuit configuration to change the clamp voltage in association with the slope of the reference signal for AD conversion is employed in the correction bias selecting section 170, it is possible to respond to a change in the slope of the reference signal SLP_ADC for AD conversion accurately.

Because this circuit configuration sets the clamp voltage under feedback control, sufficient care needs to be taken for the safety of the circuit.

In addition, the circuit configuration changes how the blackening phenomenon looks when the clamp voltage varies while a valid image signal is output.

It is therefore desirable to set the set value as follows after the slope of the reference signal SLP_ADC for AD conversion changes.

It is desirable to take such a configuration that since the clamp voltage which can be changed during outputting of a single image in the blanking period before the valid image signal is once, the set value is changed when the slope lying out of the allowance range multiple times consecutively in consideration of a variation in detection of the slope.

The operation of foregoing configuration will be described.

In the blackening detecting period K1, the correction bias selecting section 170 receives data which determines the factor for determining the slope of the reference signal SLP_ADC for AD conversion from the communication timing controller 140.

As shown in FIG. 9, for example, the correction bias selecting section 170 holds the table TBL170 for set voltages corresponding to conditions which determine the slope of the reference signal for AD conversion.

The correction bias selecting section 170 extracts a set value corresponding to the condition from the table TBL170, and sends an optimal blackening-detecting-clamp-voltage setting value SCVL to the correction bias circuit 180 in the blackening detecting period K1.

The correction bias circuit 180 selects a blackening detecting clamp voltage SLP_SUN corresponding to the blackening-detecting-clamp-voltage setting value SCVL set by the correction bias selecting section 170, and supplies the selected clamp voltage SLP_SUN to the gate of the pixel dummy amplification transistor 117 of the pixel dummy section 110B.

In the normal operation period K2, the DAC 160 generates a reference signal SLP_ADC having a slope in the P-phase mode.

In each column processing circuit (ADC) 151, the comparator 152 disposed for each column compares an analog pixel signal SIG read onto the vertical signal line 116 with the reference signal SLP_ADC.

The counter latch 153 performs a count operation until the levels of the analog pixel signal SIG and the reference signal SLP_ADC cross each other and the output of the comparator 152 is inverted.

The counter latch 153 performs the count operation in synchronism with, for example, a clock CLK, and stops the count operation and holds the count value as of then when the output level of the comparator 152 is inverted.

This reset level P phase includes a pixel-by-pixel variation.

In the second cycle, signals photoelectrically converted by the individual unit pixels 110A are read out onto the respective vertical signal lines 116 (116-1 to 116-n) (D phase) to undergo AD conversion.

The DAC 160 generates a reference signal SLP_ADC having a slope in the D phase mode too.

In each column processing circuit (ADC) 151, the comparator 152 disposed for each column compares an analog pixel signal SIG read onto the vertical signal line 116 with the reference signal SLP_ADC.

The counter latch 153 performs the count operation until the levels of the analog pixel signal SIG and the reference signal SLP_ADC cross each other and the output of the comparator 152 is inverted.

The counter latch 153 performs the count operation in synchronism with, for example, a clock CLK, and stops the count operation and holds the count value as of then when the output level of the comparator 152 is inverted.

As the (D phase level-P phase level) is executed in consideration of the result of the P phase and D phase conversions, correlated double sampling (CDS) can be realized.

The signals converted to digital signals are read into the signal processing section 190 via the horizontal transfer line LTRF sequentially by the horizontal (column) scan section to be output finally.

The column parallel output process is carried out this way.

As explained above, the solid-state imaging device according to the embodiment brings about the following advantages.

According to the embodiment, the reset voltage for the pixel section is set equal to the supply voltage which is the reference for the blackening detecting clamp voltage, thus suppressing a variation in supply voltage and ensuring a wider blackening-correctable range than that at the normal time.

In addition, the blackening detecting clamp voltage is set to the optimal one according to the slope of the reference signal for AD conversion, so that the blackening-correctable range can be made wider than that in the normal case.

While both of the schemes when adopted separately can bring about an effect of widening the blackening-correctable range, both schemes when adopted together can significantly widen the blackening-correctable range.

The solid-state imaging device which has such advantages can be used as an imaging device for a digital camera or a video camera.

<4. Example of Configuration of Camera System>

Figure 12:
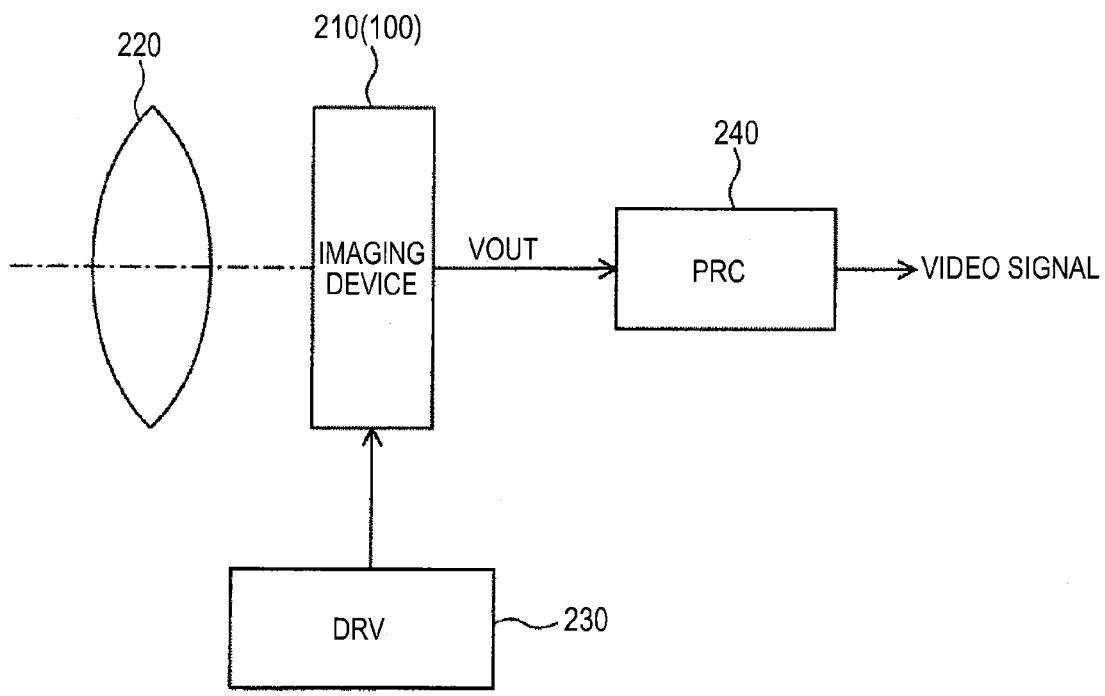
FIG. 12 is a diagram showing an example of the configuration of a camera system to which the solid-state imaging device according to the embodiment is adapted.

FIG. 12 is a diagram showing an example of the configuration of a camera system 200 to which the solid-state imaging device according to the embodiment is adapted.

As shown in FIG. 12, this camera system 200 has an imaging device 210 to which the solid-state imaging device 100 according to the embodiment is adaptable.

The camera system 200 has a lens 220 which forms the image of input light (image light) onto the imaging surface, as an optical system which guides input light to (forms a subject image on) the pixel region of the imaging device 210.

Further, the camera system 200 has a drive circuit (DRV) 230 which drives the imaging device 210, and a signal processing circuit (PRC) 240 processing the output signal of the imaging device 210.

The drive circuit 230 has a timing generator (not shown) which generates various timing signals including a start pulse and clock pulse to drive circuits in the imaging device 210, and drives the imaging device 210 with a predetermined timing signal.

The signal processing circuit 240 performs predetermined signal processing on the output signal of the imaging device 210.

An image signal processed by the signal processing circuit 240 is stored on a recording memory, such as a memory. A hard copy of image information recorded on the recording medium is made by a printer or the like. The image signal processed by the signal processing circuit 240 is displayed as a moving picture on a monitor, such as a liquid crystal display.

As described above, as the above-described solid-state imaging device 100 is mounted as the imaging device 210 in an imaging apparatus like a digital still camera, a high-definition camera can be realized.

The present application contains subject matter related to that disclosed in Japanese Priority Patent Application JP 2009-166170 filed in the Japan Patent Office on Jul. 14, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
    a pixel signal reading unit including an analog-digital (AD) converting part that reads a pixel signal from a pixel section to a signal line and compares a reference signal as a ramp waveform with the pixel signal to perform AD conversion; and
    a correction bias selecting unit that selects and supplies a clamp voltage set value to a correction bias circuit in such a way that a clamp voltage to be generated by the correction bias circuit is generated in association with slope determining information for determining a slope of the reference signal.

2. The solid-state imaging device according to claim 1, wherein each of the pixels includes:
    a photoelectric converting element;
    an output amplification transistor that outputs a pixel signal according to charges supplied to an output node;
    a transfer transistor that transfers charges generated by the photoelectric converting element to the output node; and
    a reset element that resets the output node to a reset voltage in response to a reset signal, and
    the correction bias circuit generates the clamp voltage based on a supply voltage equal to the reset voltage for the pixel section.

3. The solid-state imaging device according to claim 1, wherein the correction bias circuit has a plurality of resistors connected in series between a power supply and a reference potential to generate a plurality of divided voltages, and
    selects a voltage according to the clamp voltage set value supplied from the correction bias selecting unit from the plurality of voltages divided by the plurality of resistors, and supplies the selected voltage as the clamp voltage to the clamp unit.

4. The solid-state imaging device according to claim 1, wherein the correction bias selecting unit has a table on set voltages for conditions for determining the slope of the reference signal, extracts a set value according to the slope determining information from the table, and supplies the set value to the correction bias circuit.

5. The solid-state imaging device according to claim 1, wherein the correction bias selecting unit compares the reference signal with the clamp voltage, detects the slope of the reference signal according to a result of comparison, and, when the detected slope lies out of an allowance range, changes a setting of the clamp voltage to cause the slope to lie in the allowance range.

6. The solid-state imaging device according to claim 1, wherein the pixel signal reading unit includes:

a plurality of comparators that compare the reference signal as a ramp waveform with analog signal potentials read from a column of pixels; and a plurality of counter latches, arranged in association with the plurality of comparators to be able to count comparison times of the respective comparators, each of the counter latches stopping counting and holding a count value when an output of the associated comparator is inverted.

7. A control method for a solid-state imaging device comprising the steps of:

reading pixel signals from a pixel section to a signal line;

clamping the signal line with a clamp voltage in such a way that the pixel signal is held at or greater than a set voltage; and allowing an analog-digital (AD) converting part to compare a reference signal as a ramp waveform with the pixel signals to perform AD conversion, wherein in the clamping step, a clamp voltage set value is selected in such a way that the clamp voltage is generated in association with slope determining information for determining a slope of the reference signal, and a clamp voltage according to the selected clamp voltage set value is generated to clamp the signal line with the clamp voltage.

8. A camera system comprising:

a solid-state imaging device; and an optical system that forms an image of a subject on the solid-state imaging device, the solid-state imaging device including a pixel signal reading unit including an analog-digital (AD) converting part that reads a pixel signal from a pixel section to a signal line and compares a reference signal as a ramp waveform with the pixel signal to perform AD conversion, and a correction bias selecting unit that selects and supplies a clamp voltage set value to a correction bias circuit in such a way that a clamp voltage to be generated by the correction bias circuit is generated in association with slope determining information for determining a slope of the reference signal.

9. The camera system according to claim 8, further comprising:

the pixel section that includes a plurality of pixels arranged in a matrix form, each of the plurality of pixels being configured to perform photoelectric conversion.

10. The camera system according to claim 8, further comprising:

a clamp unit that clamps the signal line with the clamp voltage in such a way that the pixel signal is held at or greater than a set voltage.

11. The camera system according to claim 8, further comprising:

the correction bias circuit that generates the clamp voltage according to the clamp voltage set value supplied and supplies the clamp voltage to the clamp unit.

12. The solid-state imaging device according to claim 1, further comprising:

the pixel section that includes a plurality of pixels arranged in a matrix form, each of the plurality of pixels being configured to perform photoelectric conversion.

13. The solid-state imaging device according to claim 1, further comprising:

a clamp unit that clamps the signal line with the clamp voltage in such a way that the pixel signal is held at or greater than a set voltage.

14. The solid-state imaging device according to claim 1, further comprising:

the correction bias circuit that generates the clamp voltage according to the clamp voltage set value supplied and supplies the clamp voltage to the clamp unit.

15. The solid-state imaging device according to claim 1, wherein each of the pixels includes:

a photoelectric converting element;

an output amplification transistor that outputs a pixel signal according to charges supplied to an output node;

a transfer transistor that transfers charges generated by the photoelectric converting element to the output node; and a reset element that resets the output node to a reset voltage in response to a reset signal.

16. The solid-state imaging device according to claim 15, wherein the correction bias circuit generates the clamp voltage based on a supply voltage equal to the reset voltage for the pixel section.

17. The solid-state imaging device according to claim 1, wherein the correction bias circuit includes a plurality of resistors connected in series between a power supply and a reference potential to generate a plurality of divided voltages.

18. The solid-state imaging device according to claim 17, wherein the correction bias circuit selects a voltage according to the clamp voltage set value supplied from the correction bias selecting unit from the plurality of voltages divided by the plurality of resistors, and supplies the selected voltage as the clamp voltage to the clamp unit.

19. The solid-state imaging device according to claim 1, wherein the correction bias selecting unit has a table on set voltages for conditions for determining the slope of the reference signal.

20. The solid-state imaging device according to claim 19, wherein the correction bias selecting unit extracts a set value according to the slope determining information from the table and supplies the set value to the correction bias circuit.

21. The solid-state imaging device according to claim 1, wherein the pixel signal reading unit includes:

a plurality of comparators that compare the reference signal as a ramp waveform with analog signal potentials read from a column of pixels.

22. The solid-state imaging device according to claim 21, wherein the pixel signal reading unit includes:

a plurality of counter latches, arranged in association with the plurality of comparators to be able to count comparison times of the respective comparators, each of the counter latches stopping counting and holding a count value when an output of the associated comparator is inverted.

23. The control method according to claim 7, wherein the pixel section includes a plurality of pixels arranged in a matrix form, each of the plurality of pixels being configured to perform photoelectric conversion.

* * * * *